United States Patent [19]

Woodson, III et al.

[11] 4,053,890
[45] Oct. 11, 1977

[54] INTERNAL CALIBRATION SYSTEM

[75] Inventors: David S. Woodson, III, Clinton, Md.; Louis R. Rudolph, Annandale, Va.

[73] Assignee: The United States of America as represented by the Secretary of the Navy, Washington, D.C.

[21] Appl. No.: 689,895

[22] Filed: May 25, 1976

[51] Int. Cl.² .............................................. G01S 7/40
[52] U.S. Cl. ................................... 343/17.7; 340/5 C
[58] Field of Search ........................ 343/17.7; 340/5 C

[56] References Cited
U.S. PATENT DOCUMENTS 3,199,107  8/1965   Mills .................................... 343/17.7
3,323,123  5/1967   Hegarty et al. ..................... 343/17.7

Primary Examiner—S. C. Buczinski
Attorney, Agent, or Firm—R. S. Sciascia; Philip Schneider; William C. Daubenspeck

[57] ABSTRACT

A pulse-generation means produces RF pulses that are injected into the radar receiver. A range control means and an attenuation control means selectively vary the range and the signal strength of the RF pulses in either a manual or an automatic sequence. A display and evaluation means determines the signal strength at which a radar tracking lock is established and compares that signal strength with a standard to provide an indication of receiver operability.

4 Claims, 2 Drawing Figures

INTERNAL CALIBRATION SYSTEM

BACKGROUND OF THE INVENTION

This invention relates to radar testing apparatus and more particularly to apparatus which automatically calibrates radar receiver sensitivity in pulse-type radar systems.

It is important that the operational condition of a radar system be evaluated frequently to determine if the system is functioning in a satisfactory manner. Radar functions of prime importance must be tested to provide verification of proper equipment operation or a warning of malfunctions in the system. Radar receiver sensitivity is one of the most important areas to be examined in analysing a radar's operational readiness and standard of performance.

Heretofore, testing methods have required that a calibration procedure be performed manually with the procedure comprising a series of separate steps which are conducted one step at a time. Extensive periods of time and several operators are often required to perform the tests. Frequently the radar system to be tested is installed in a location that makes access to the various units difficult, further increasing the time and cumbersomeness of the task. In addition, the testing procedures vary according to the specific type of radar system under test and in the actual procedures used by the personnel conducting the test. This non-uniformity of test procedures often results in poor correlation between the calibration of different radar systems.

SUMMARY OF THE INVENTION

The present invention overcomes the disadvantages of the prior art by automatically performing the calibration of a pulse-type radar receiver. A simulated target echo is automatically varied in range and singal strength in a programmed manner and injected into the radio-frequency input of a radar receiver to determine the sensitivity of the receiver as a function of target range. Specifically, the output of a microwave oscillator is converted to pulses corresponding to target returns of selectable range and selectable signal strength. The radar calibration apparatus automatically varies the signal levels and range delays that are imposed on the radar to establish the levels at which the radar produces an automatic signal lock, and the signal strength of the simulated signal which produces a radar tracking lock is compared with a predetermined value to provide a GO/NO GO indication of receiver operability. The calibration apparatus also directs the radar antenna to various preselected positions to examine the antenna drive controls.

An object of the present invention is to test radar functions of prime importance and provide an easily intepreted warning of malfunctions.

Another object of the present invention is to automatically test the sensitivity of a radar receiver and provide a GO/NO GO indication of operability.

A further object of the present invention is to automatically calibrate the sensitivity of a radar receiver as a function of target range.

Yet another object of the present invention is to provide a simulated target echo which may be varied in range and signal strength for use in testing radar receivers.

A still further object of the present invention is to establish uniform testing procedures for different radar systems.

Another object of the present invention is to test radar receiver sensitiviity with minimal operator participation.

Still another object of the present invention is to test radar receiver sensitivity with minimal interference with normal radar operation.

BRIEF DESCRIPTION OF THE DRAWING

Other objects and many attendant advantages of this invention will be readily appreciated as the same becomes better understood by reference to the following detailed description when considered in conjunction with the accompanying drawing wherein.

DESCRIPTION OF THE PREFERRED EMBODIMENT

Figure 1A:
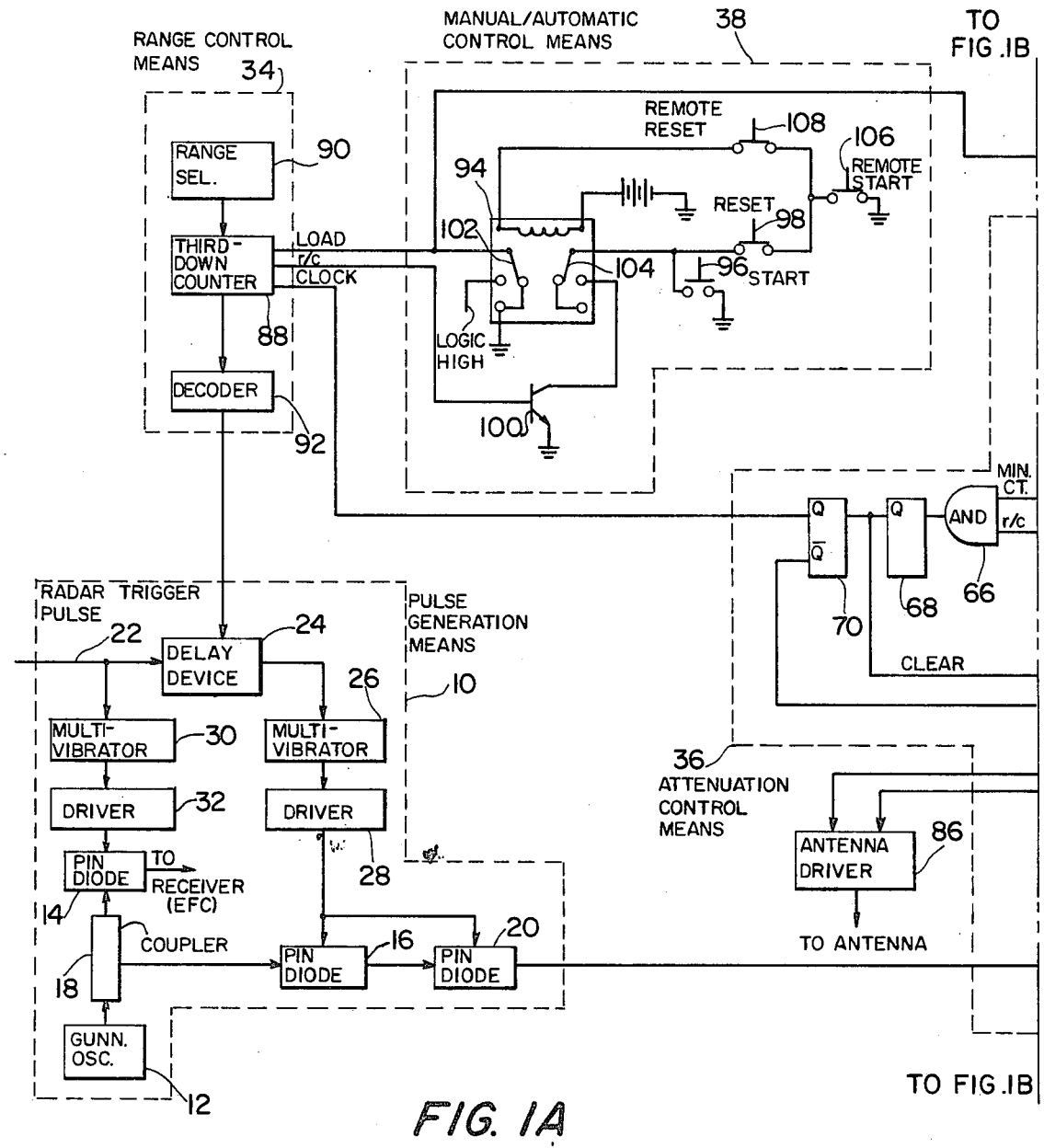
FIGS. 1A and 1B combined together are a block diagram illustrating the various components of an embodiment of the present invention.
Figure 1B:
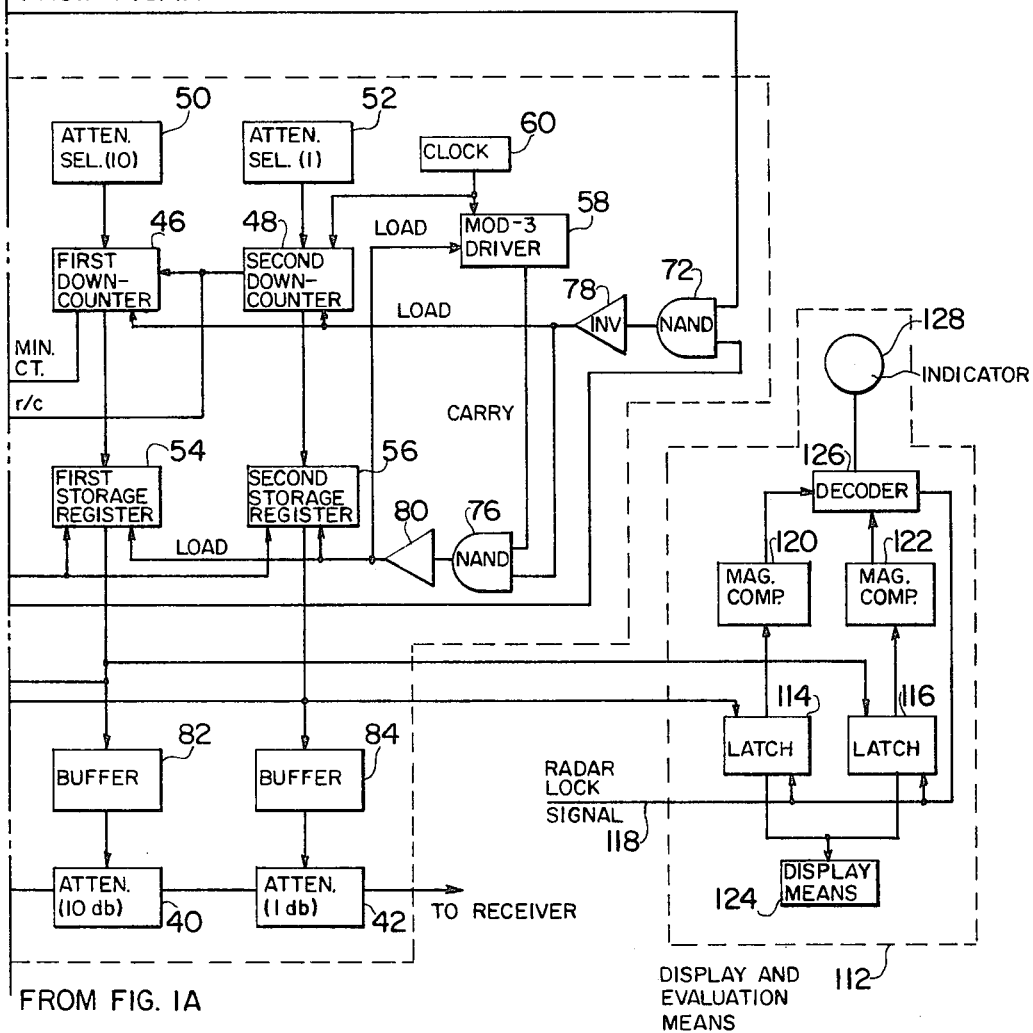

Referring now to FIGS. 1A and 1B, radio-frequency pulses are generated by the pulse generating means shown at 10. A continuous wave microwave frequency signal is generated by a Gunn oscillator 12. The output of the microwave oscillator 12 is supplied to a PIN diode 14 and a PIN diode 16 through a coupler 18. The output of PIN diode 16 is in turn applied to a third PIN diode 20. Each of these diodes is biased to conduction by radar trigger pulses 22 so that pulsed microwave signals are formed.

The radar trigger pulse 22 is applied to a delay device 24 for producing a trigger which corresponds in time to an echo received from a target at a specified range. Delay device 24 comprises a matrix of delay multivibrators (not shown), each multivibrator having a quasi-stable state of a duration corresponding to the equivalent number of nautical miles of range at which it is desired to check system performance. The delay multivibrators are coupled so that only the multivibrator that corresponds to the range to be tested is enabled. The selection of range parameters will be described presently. The delay device 24 produces a pulse having a pulse width corresponding to the selected range delay, with the trailing edge serving as a delayed radar trigger. The output of delay device 24 is applied to a monostable multivibrator 26 whose output in turn is applied to a driver device 28. Multivibrator 26 and driver device 28 impart to the delayed radar trigger appropriate pulse width and power characteristics for controlling the PIN diode 16.

The output of PIN diode 16 is a microwave pulse which simulates a target echo from a target at a specific range in response to the radar transmitter pulse associated with radar trigger 22. It will be appreciated that for best operation of the system, the pulse produced by PIN diode 16 must have the same characteristics as the target echoes received by the radar during normal operation in response to pulses produced by the radar transmitter itself.

Driver device 28 is also coupled to PIN diode 20 such that diodes 16 and 20 are activated simultaneously. Two PIN diodes 16 and 20 are utilized in this embodiment to ensure adequate isolation of the Gunn oscillator when the diodes are not conducting. It will be appreciated that only one diode is required.

The radar trigger pulse 22, in addition to being coupled to the delay device 24, is also applied directly to a monostable multivibrator 30 whose output is in turn applied to a driver device 32. Multivibrator 30 and driver device 32 impart to the radar trigger appropriate pulse characteristics for controlling PIN diode 14. The output of the diode 14 is used as a reference correlated to the transmitter pulse and is coupled to the electronic frequency control EFC (not shown) of the radar receiver in order to tune the receiver to the frequency of the expected target-return pulse.

The time delay and signal strength of the RF pulses which are injected into the radar receiver are varied by a range control means and an attenuation control means shown at 34 and 36, respectively. A manual/automatic means shown at 38, is coupled to the range control means 34 and the attenuation control means 36 to enable or disable automatic operation of the calibration apparatus.

Referring now to the attenuation control means 36, the RF pulses which are the output of PIN diode 20, are applied serially to a first programmable attenuator 40 and to a second programmable attenuator 42. Attenuator 40 is programmble in 10 db steps and attenuator 42 is programmable in 1 db steps according to the attenuation selected. Attenuators suitable for use here are the HP 33305 and the HP 33304 attenuators made by the Hewlett-Packard Company — these are programmable in 10 db and 1 db steps, respectively.

The settings of attenuators 40 and 42 are established by the additional circuity included in block 36. A first down-counter 46 and a second down-counter 48 each receive an input from a tens attenuation selector 50 and a ones attenuation selector 52, respectively. Selectors 50 and 52 provide a data count of 0-9 to the respective counters and may be thumbwheel switches such as the Digitran Model 721, a BCD device, made by the Digitran Company, Pasadena, Calif. Texas Instruments Company Integrated Circuit SN 74190, an up/down BCD counter with mode control that is capable of being cascaded for n-bit applications, is suitable for use as a down-counter 46 or 48.

The data outputs of the first down-counter 46 and the second down-counter 48 are coupled to a first storage register 54 and second storage register 56, respectively. A modulus-3 divider 58 and the second down-counter 48 receive inputs from a clock 60. Texas Instruments Integrated Circuit SN 74193, a programmable 4-bit binary counter, is suitable for use as storage register 54 or 56 or divider 58.

A two-input AND device 66 has a first input coupled to a minimum count signal from the first down-counter 46 and a second input coupled to a ripple clock signal from the second down-counter 48. The ripple clock signal from the second down-counter 48 is also applied to the clock input of the first down-counter 46 so that counters 46 and 48 are cascaded. As is common in the art, a minimum count signal is produced by the down-counter when the count is zero and a ripple clock signal is produced when the count is zero and the down-counter receives a clock pulse. A monostable multivibrator 68 is coupled to the output of AND device 66. The noncomplementary output Q of multivibrator 68 is coupled to the input of a second monostable multivibrator 70 and to the clear input of the storage registers 54 and 56. The noncomplementary output Q of multivibrator 70 is coupled to range control means 34 in order to provide a clocking signal when the first and second down-counters 46 and 48 are at zero.

A first two input NAND device 72 has a first input coupled to the complementary output $\bar{Q}$ of multivibrator 70 and a second input coupled to the manual/automatic control means 38. A second two-input NAND device 76 has a first input coupled to the output of NAND device 72 via an inverter 78 and a second input coupled to a carry output of the modulus-3 divider 58. The output of the inverter 78 is also coupled to the load data controls of down-counters 46 and 48. The output of NAND device 76 is coupled via inverter 80 to the load data controls of the storage registers 54 and 56 and the modulus-3 divider 58. It is noted that a NAND-/inverter combination (such as NAND 72 /inverter 78 and NAND 76/inverter 80) is logically equivalent to an AND device.

The data in the storage registers is utilized to program the attenuators and to position the radar antenna. Accordingly, the data ouputs of storage registers 54 and 56 are coupled to attenuators 40 and 42, resepectively, via buffers 82 and 84, respectively. The buffers provide the proper signals and voltages to control the attenuators so that the attenuation of the RF pulses is set to a value corresponding to the count in the storage registers.

The data outputs of the storage registers 54 and 56 are also coupled to an antenna driver 86. The antenna driver utilizes the data in the storage registers to produce a voltage signal which is applied to the antenna servo loop to drive the antenna to various positions based on the count in the storage registers, so that the operation of the antenna drive mechanism may be checked.

Referring now to the range control means 34, a third down-counter 88 receives an input from a range selector 90 and has its output coupled to delay device 24 (of pulse generation means 10) via a decoder 92. Decoder 92 converts the code of down-counter 88 to decimal outputs for controlling delay device 24. Digitran Model 721 previously described as suitable for use as attenuation selector 50 and 52, may also be used as selector 90. Texas Instruments Integrated Circuit SN 74190, previously described as suitable for use as down-counters 46 and 48, may be used as down-counter 88, and Integrated Circuit Sn 7442, a BCD to decimal (one-of-ten) decoder, is suitable for use as decoder 92.

The third down-counter 88 has its clock input coupled to the Q output of multivibrator 70 and receives a load data control signal from the manual/automatic control means 38.

Referring now to the manual/automatic control means 38, a run/reset relay 94, shown in the de-energized position in the FIG. 1A, is coupled to the third down-counter 88 (of range control means 34), to NAND device 72 (of attenuation control means 36), to a start switch 96, and to reset switch 98. Relay 94 is a double-pole double-throw device having a first terminal coupled to the load data controls of the third down-counter 88 and to the second input of NAND device 72, a second terminal coupled to a logical high signal, a third terminal coupled to a logical low signal, a fourth terminal coupled to the start switch 96 and the reset switch 98, and a fifth terminal coupled to the collector of a transistor 100, having its base coupled to the ripple clock output of the third down-counter 88 and its emitter coupled to the relay control supply return. In the de-energized state, a normally closed contact 102 of relay 94 connects the first terminal to the third terminal;

in the energized state, contact 102 connects the first terminal to the second terminal and a normally open contact 104 of relay 94 connects the fourth terminal to the fifth terminal.

The start switch 96, a momentary contact switch, is connected between the fourth terminal of relay 94 and the relay supply voltage return to ground. The reset switch 98, a normally closed switch, is connected between the fourth terminal of relay 94 and negative terminal of the relay coil.

The preferred embodiment has a remote start switch 106, a momentary contact switch which is connected in parallel with start switch 96, and a remote reset switch 108, a normally closed switch which is connected in series with reset switch 98.

A display and evaluation means 112 is coupled to the attenuation control means 36. The data in the storage registers is utilized to display the attenuator settings and to evaluate the radar receiver sensitivity. To that end, the data outputs of the storage registers 54 and 56 are applied to a first bistable latch 114 and a second bistable latch 116, respectively. Bistable latch SN7475 made by Texas Instruments is a device suitable for use as latch 114 and 116. Latches 114 and 116 are also coupled to radar "lock" signal 118. The "lock" signal is produced when the radar has a video pulse captured in the control loop. The outputs of latches 114 and 116 are coupled to magnitude comparators 120 and 122, respectively, and to attenuation display means 124. Magnitude Comparator SN7485 made by Texas Instruments is a device suitable for use as comparators 120 and 122. A decoder 126 is coupled to the output of the magnitude comparators and to the radar "lock" signal and drives a GO/NO GO indicator 128. Decoder/driver SN7445 made by Texas Instruments is a device suitable for use as decoder 126.

In operation, the foregoing apparatus accomplishes either a manually controlled or a fully automatic calibration or radar receiver sensitivity. The run/reset relay 94 performs the function of holding the system in an automatic run and initializing the range and attenuation counters at the end of a run. Relay 94 is de-energized when an automatic run is not in progress. In this de-energized state, a logical low signal is applied through relay contact 102 to the second input of NAND device 72 and to the load data control of the third down-counter 88 (range counter). Since NAND device 72 produces a logical high when either of its two inputs are low, a logical high is applied to inverter 78, which in turn causes a logical low to be applied to the load data controls of the first and second down-counters 46 and 48 (attenuation counters). Counters 46, 48 and 88 interpret the logical low as a load data signal which causes the data present in selectors 50, 52 and 90 to be loaded into the appropriate counters.

The logical low at the output of inverter 78 also produces a logical high at the output of NAND device 76, and consequently, a logical low at the output of inverter 80. The storage registers 54 and 56 and the modulus-3 divider 58 interpret this logical low as a load data signal which causes the data present in the attenuation counters 46 and 48 to be loaded into the storage registers 54 and 56, respectively, and a preset number to be loaded into modulus-3 divider 58. The function of divider 58 will be described presently during the explanation of automatic operation.

The data in the storage registers, which now corresponds to the settings of the attenuation selectors 50 and 52, is utilized to program the attenuators 40 and 42 to the selected attenuation and to drive the radar antenna to a specified position. Similarly, the data in range counter 88, which now corresponds to the setting of range selector 90, is applied to delay device 24 via decoder 92 to provide the appropriate time delay for the range selected. In this embodiment, decoder 92 converts the BCD format of range counter 88 to a one-of-ten output to enable the appropriate delay multivibrator in delay device 24. Although this embodiment is limited to nine ranges, it is apparent that the number of ranges available may be increased by cascading additional range counters with counter 88 and increasing the number of delay multivibrators in delay device 24 accordingly. As previously described, the delayed radar trigger is applied to PIN diodes 16 and 20 via multivibrator 26 and driver 28 to produce a radio-frequency pulse delayed in time according to the selected range. Thus radio-frequency pulses, having the selected attenuation and delayed in time according to the selected range, are injected into the radar receiver.

The data in the storage registers 54 and 56 is also applied to the latches 114 and 116 for display and evaluation purposes. The data which is present at the input to a latch is transferred to the output of the latch if a lock signal 118 from the radar is not present. When the lock signal 118 occurs, the data present at the input of the latch when the transition occurred is retained at the latch output until the "lock" is broken. The attenuation display means 124 displays the data present at the output of the latches.

In order to provide a GO/NO GO status indication, the data presently held in latches 114 and 116 is compared against a number which has been determined as an acceptable level of attenuation for the "lock" transition to occur. Magnitude comparators 120 and 122 receive the output of latches 114 and 116 and determine if the signal level of the attenuated radiofrequency pulse is less than the predetermined standard. If the signal level is less than the standard and "lock" is also present, decoder 126 provides a GO signal to indicate an acceptable receiver sensitivity level. Alternatively a NO/GO signal is produced. The GO/NO GO signals drive indicator 128 to display the status to the test operator.

Turning now to the automatic operation of the radar calibration apparatus, an automatic run is initiated by a momentary closure of either start switch 96 or remote start switch 108 which energizes run/reset relay 94 by completing the relay control circuit. Once energized, the relay control circuit is completed through relay contact 104 and transistor 100. Transistor 100 is coupled to the ripple clock of the range counter 88 such that the relay control circuit is completed as long as the range counter is not at zero. When range counter 88 reaches zero, the ripple clock signal turns off transistor 100, interrupting the relay control circuit, de-energizing relay 94, and placing the calibration apparatus in annual operation.

When run/reset relay 94 is energized, a logical high is applied to the second input to NAND device 72 and to the load data control of the range counter 88. Since the first input to NAND device 72, the complementary output Q of multivibrator 70, is high unless the attenuation count is zero (as will presently be explained), the output of NAND device 72 is a logical low. This logical low, applied through inverter 78, removes the attenuation counters 46 and 48 from the load data mode, and the second down-counter 48 begins to count down at a rate determined by clock 60.

Since both inputs to NAND device 76 are a logical high, producing a logical high at the output of inverter 80, the modulus-3 divider 58 and the storage registers 54 and 56 are also removed from the load data mode and divider 58 begins to count up from the preset count which was loaded by the last load data control signal.

In this embodiment, the preselected count of divider 58 is chosen so that is produces a "carry" output every third clock pulse. This carry pulse is applied as a logical low to the second input of NAND device 76 and causes storage registers 54 and 56 to be loaded with the data presently in the attenuation counters 46 and 48 and the divider 58 to be loaded with the preset count. Since the first down-counter 46 is clocked by the ripple clock outut of the second down-counter 48, it counts down one count whenever the second down-counter 48 passes through the zero state.

The operation of the attenuation counters and divider 58 may be summarized as follows: the second down-counter 48 changes down one count every clock pulse, the first down-counter 46 changes down one count every time the second down-counter 48 passes through zero; and divider 58 changes one count every clock pulse, but resets itself every third count. When the divider resets, it shifts the present count in the down-counters 46 and 48 to the storage registers 54 and 56. The storage registers then hold that number for three clock pulses.

AND device 66 and multivibrators 68 and 70 function as a zero-determination circuit for the attenuation counters. When first down-counter 46 and second down-counter 48 both reach zero, monostable multivibrator 68 is triggered by the output of AND device 66 upon the coincidence of a minimum count signal from down-counter 46 and a ripple clock signal from down-counter 48. The noncomplementary output Q of multivibrator 68 provides a clear pulse to storage registers 54 and 56. The combined delays of multivibrators 68 and 70 are set to approximately three clock pulses, with most of the delay occurring in multivibrator 68. The effect of this is to force the storage registers to zero for approximately a full three counts when the previous counts in the storage registers are 02 or 01. This sets the attenuation to zero db for approximately three counts at the end of each attenuation countdown.

The trailing edge of the Q output of multivibrator 68 triggers multivibrator 70. The Q output of multivibrator 70 is used to clock the third down-counter 88 (range counter) at the end of each attenuator countdown. The Q output of multivibrator 70 via NAND device 72 and inverter 78, loads the first and second down-counters 46 and 48 with the data in attenuation selectors 50 and 52. The storage registers 54 and 56 and the and the modulus-3 divider 58 are also loaded with new data via NAND device 76 and inverter 80.

The range counter 88 steps down one count for each clock pulse received from multivibrator 70. As previously described, when the range count reaches zero, the ripple clock output of range counter 88 will interrupt the control circuit of run/reset relay 94, causing the automatic operation to terminate, and loading the counters 46, 48 and 88 with the data in the range and attenuation selectors.

In automatic operation, the data in the storage registers is transferred to the latches 114 and 116, attenuation buffers 82 and 84, and antenna driver 86 in the same manner as previously described in the explanation of manual operation.

An automatic run may be interrupted by activating reset switch 98 or remote reset switch 108. Activation of a reset switch returns the calibration apparatus to manual operation by interrupting the relay control circuit, thus de-energizing run/reset relay 94 and loading the counters 46, 48 and 88 with the data in the range and attenuation selectors.

A typical use of the radar calibration apparatus would be to serve as a calibration device for an airborne pulse-type radar system. Since the apparatus is designed to be controlled from both a local and a remote location, it may be used to completely and automatically calibrate the radar receiver as a part of a thorough testing of the radar by technicians on the ground or it can be used as a quick check of operability by the pilot prior to or during flight. Typically, the pilot of an aircraft using the radar calibration appartus will have a remote control panel on the instrument panel of the aircraft which will give control over the operation of the system. The pilot initiates an automatic by activating the start switch on the remote control panel, which causes the apparatus to automatically step through the attenuations and ranges initialized by the selectors. When the attenuation is low enough to provide a signal of sufficient power to the radar system, the radar will lock onto the signal and the remote control panel will provide a GO or a NO/GO indication of system performance.

The radar calibration apparatus may be used as a tool in a more complete examination or radar performance. An operator who uses the radar calibration apparatus for a thorough examination of radar receiver may employ both manual and automatic operation. Under manual operation receiver sensitivity may be tested at signal attenuation of 0 to 99 db in 1 db increments. Under automatic operation, the receiver may be tested at signal attenuation of 0 to 99 db in 3 db increments.

From the foregoing description, it may readily be seen that the subject invention provides apparatus which automatically calibrates the sensitivity of a radar receiver, and greatly reduces the time and personnel required for such calibration. The apparatus provides a uniform testing method which is applicable to various types of radar systems and which will result in more uniform test results. It will be appreciated that the present invention is not limited to pulse type radars but has application to the calibration of any radar receiver.

It should be understood that the specific integrated circuits discussed herein are only illustrative and are not intended to limit the invention to the specific circuits mentioned.

Obviously many modifications and variations of the present invention are possible in light of the above teachings. It is therefore to be understood that within the scope of the appended claims, the invention may be practiced otherwise than as specifically described.

What is claimed and desired to be secured by letters patent of the United States is:

1. Apparatus for automatically calibrating a pulse-type radar receiver, which comprises:
   pulse-generation means coupled to a radar trigger for producing pulses of RF radiation at a selectable time delay after receiving said radar trigger for injection into the radar receiver to simulate signals reflected from a target;
   attenuation control means coupled to said pulse-generation means for selectively varying the attenuation of said time-delay RF pulses, said attenuation control means comprising a first down-counter, a second down-counter, a tens attenuation selector for setting the initial count in said first down-counter, a ones attenuation selector for setting the initial count in said second down-counter, means coupled to said first and said second down-counters for attenuating said RF pulses corresponding to the counts in said first and said second down-counters, and means for resetting said first and said second down-counters with the initial counts when the counts in said first and said second down-counters are zero;

range control means coupled to said pulse-generation means for selecting the time delay of said RF pulses, said range control means comprising a third down-counter coupled to said pulse-generation means to select to time delay of said RF pulses, said third down-counter being further coupled to said attenuation control means so that the third down-counter is clocked when the counts in said first and said second down counters are zero, and a range selector coupled to said third down-counter;

manual/automatic control means coupled to said range control means to control the counting of said third down-counter and to reset said third down-counter to the initial count when the count is zero, said manual/automatic control means further coupled to said attenuation control means to control the counting of said first and said second down-counters; and display and evaluation means coupled to said attenuation controll means and to a radar lock signal for determining the amplitude of said RF pulses which produces a radar tracking lock, said display and evaluation means further comparing the amplitude of said RF pulses which produces a radar lock with a predetermined standard to provide an indication of the radar receiver's operational status.

2. Appartus for automatically calibrating a pulse-type radar receiver, which comprises:

pulse generation means coupled to a radar trigger for producing pulses of RF radiation at a selectable time delay after receiving said radar trigger for injection into the radar receiver to simulate signals reflected from a target;

attenuation control means coupled to said pulse-generation means for selectively varying the attenuation of said time-delayed RF pulses, said attenuation control means comprising a first down-counter, a second down-counter, a tens attenuation selector for setting the initial count in said first down-counter, a ones attenuation selector for setting the initial count in said second down-counter, a first storage register coupled to said first down-counter to receive the counts from said first down-counter, a second storage register coupled to said second down-counter to receive the count from said second down-counter, a modulus - n - divider coupled to said first and said second storage registers for transferring the count in said first down-counter to said first storage register and the count in said second down-counter to said second storage register each nth count, means coupled to said first and said second storage registers for attenuating said RF pulses corresponding to the counts in said first and said second storage registers, and means for resetting said first and said second down-counters with the initial counts when the counts in said first and said second down-counters are zero;

range control means control coupled to said pulse-generation means for selecting the time delay of said RF pulses, said range control means comprising a third down-counter coupled to said pulse-generation means to select the time delay of said RF pulses, said third down-counter being further coupled to said attenuation control means so that the third down-counter is clocked when the counts in said first down-counter and said second down-counters are zero, and a range selector coupled to said third down-counter for setting the initial count in said third down-counter;

manual/automatic control means coupled to said range control means to control the counting of said third down-counter and to reset said third down-counter to the initial count when the count is zero, said manual/automatic control means further coupled to said attenuation control means to control the counting of said first and said second down-counters; and display and evaluation means coupled to said attenuation control means and to a radar lock signal for determining the amplitude of said RF pulses which produces a radar lock, said display and evaluation means further comparing the amplitude of said RF pulses which produces a radar lock with a predetermined standard to provide an indication of the radar receiver's operational status.

3. Apparatus as recited in claim 2, wherein said pulse-generation means comprises:

a delay device coupled to said third down-counter and to a radar trigger for providing a trigger pulse delayed in time from said radar trigger corresponding to a range selected by the count in said third down-counter;

an oscillator for generating a continuous RF signal; and a PIN diode coupled to said oscillator, said PIN diode being controlled by said trigger pulses from said delay device to convert the continuous wave RF signal to RF pulses, said RF pulses being coupled to said attenuation control means.

4. Apparatus as recited in claim 3, further comprising means coupled to said attenuation control means for producing a signal to drive a radar antenna to selected positions based on the count in said first and second storage registers.

* * * * *